(12) United States Patent
Vadlamudi (10) Patent No.: US 8,644,237 B2
(45) Date of Patent: Feb. 4, 2014

(54) UPLINK LOAD GENERATION IN COMMUNICATION NETWORKS

(75) Inventor: Sridhar Vadlamudi, Frisco, TX (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 166 days.

(21) Appl. No.: 13/244,427

(22) Filed: Sep. 24, 2011

(65) Prior Publication Data

US 2013/0077575 A1 Mar. 28, 2013

(51) Int. Cl.
H04W 4/00 (2009.01)
(52) U.S. Cl.
USPC .................. 370/329; 370/400; 370/465
(58) Field of Classification Search
USPC .............. 370/328–329, 335–336, 340–343, 370/345–346, 348, 400–401, 437, 441–443, 370/465, 479–480, 498
See application file for complete search history.

(56) References Cited

U.S. PATENT DOCUMENTS

| 7,068,623 | B1 * | 6/2006 | Barany et al. | 370/329 |
|---|---|---|---|---|
| 8,150,397 | B2 * | 4/2012 | Khetawat et al. | 455/436 |
| 2003/0223381 | A1 * | 12/2003 | Schroderus | 370/285 |
| 2005/0265430 | A1 * | 12/2005 | Ozluturk et al. | 375/145 |
| 2008/0076419 | A1 * | 3/2008 | Khetawat et al. | 455/435.1 |
| 2009/0010213 | A1 * | 1/2009 | Yamada et al. | 370/329 |
| 2009/0262704 | A1 * | 10/2009 | Khetawat et al. | 370/331 |
| 2010/0074159 | A1 * | 3/2010 | Yamada et al. | 370/312 |
| 2010/0075678 | A1 | 3/2010 | Akman et al. | |
| 2010/0157950 | A1 * | 6/2010 | Ozluturk et al. | 370/335 |
| 2011/0075675 | A1 * | 3/2011 | Koodli et al. | 370/401 |
| 2011/0176530 | A1 | 7/2011 | Vikberg et al. | |
| 2011/0235605 | A1 * | 9/2011 | Yeoum et al. | 370/329 |
| 2012/0002635 | A1 * | 1/2012 | Chung et al. | 370/329 |

FOREIGN PATENT DOCUMENTS

WO 2011/025433 A1 3/2011

OTHER PUBLICATIONS

Motorola Technical White Paper "Long Term Evolution (LTE): A Technical Overview", 2007.
3GPP TS 36.304 V8.8.0, Technical Specification Group Radio Access Network; Evolved Universal Terrestrial Radio Access (E-UTRA); User Equipment (UE) procedures in idle mode (Release 8), Dec. 2009.
3GPP TS 36.413 V8.8.0, Technical Specification Group Radio Access Network; Evolved Universal Terrestrial Radio Access Network (E-UTRAN); S1 Application Protocol (S1AP) (Release 8), Dec. 2009.

(Continued)

*Primary Examiner* — Kevin Mew
(74) *Attorney, Agent, or Firm* — Potomac Patent Group PLLC (57) ABSTRACT

Uplink load generation and control simplify network testing and other tasks. For example, a network operator can decide to test the network by imposing a test load in a selected uplink. The operator can suitably configure an appropriate Mobility Management Entity (MME) with information using a network Operations and Maintenance Support System. In due course, the MME informs the selected user equipment (UE): if the UE is in Idle mode, the network sends a page message; if the UE is in Active mode, with an on-going communication session, the page message is sent after the session ends; and if the UE is detached from the network, the UE is informed during the initial network attach procedure. Thus, uplink load generation is controllable by the network operator, enabling the operator to adjust an existing network and perform realistic simulations on a "green field" network, i.e., a network before launch.

16 Claims, 4 Drawing Sheets

(56) References Cited

OTHER PUBLICATIONS

3GPP TS 36.401, V8.7.0, Technical Specification Group Radio Access Network; Evolved Universal Terrestrial Radio Access Network (E-UTRAN); Architecture description (Release 8), Sep. 2009.
3GPP TS 36.331, V9.0.0, Technical Specification Group Radio Access Network; Evolved Universal Terrestrial Radio Access (E-UTRA) Radio Resource Control (RRC); Protocol Specification (Release 9), Sep. 2009.
3GPP TS 36.211, V9.1.0, Technical Specification Group Radio Access Network; Evolved Universal Terrestrial Radio Access (E-UTRA); Physical Channels and Modulation (Release 9), Mar. 2010.
EPO, Int'l Search Report in PCT/IB2012/054512, Jan. 8, 2013.
EPO, Written Opinion in PCT/IB2012/054512, Jan. 8, 2013.
3GPP, S1 Application Protocol (S1AP) (Release 10), Technical Specification 36.413 V10.3.0, Sep. 2011.

* cited by examiner

UPLINK LOAD GENERATION IN COMMUNICATION NETWORKS

TECHNICAL FIELD

This invention relates to electronic digital communication systems and more particularly to cellular radio communication systems.

BACKGROUND

According to the Third Generation Partnership Project (3GPP) specifications for wireless communication systems (Release 8 and later Releases), a Long Term Evolution (LTE) cellular radio communication system uses Orthogonal Frequency Division Multiple Access (OFDM) as a multiple access technique (called OFDMA) in the downlink (DL) from network nodes (evolved NodeBs, or eNodeBs) to user equipments (UEs) and Discrete Fourier Transform (DFT)-spread OFDM in the uplink (UL) from UEs to eNodeBs (eNBs). In an OFDMA communication system, a data stream to be transmitted is portioned among a number of narrowband subcarriers that are transmitted in parallel. In general, a Physical Resource Block (PRB) is a particular number of particular subcarriers used for a particular period of time. Different groups of subcarriers can be used at different times for different purposes and different users. The LTE specifications can be seen as an evolution of current wideband code division multiple access (WCDMA) system specifications. An LTE system is sometimes also called an Evolved Universal Terrestrial Radio Access (E-UTRA) communication system.

In an LTE network, UL load generation for testing and other purposes is performed by special equipment (which can be called an uplink load tool) that computes the load in the uplink. Current uplink load tools have a number of drawbacks, such as that the network operator does not have positive control over the uplink load but only a guess at the load. For example, the exact number of UL PRBs and the power per PRB are not controlled by the uplink load tool but by the Scheduler in the eNB. Another drawback is that load generation requires special equipment, and so existing UEs cannot be used for load generation.

SUMMARY

In accordance with aspects of some embodiments of this invention, there is provided a method of generating an uplink (UL) load in a communication network. The method includes determining whether a user equipment (UE) in the communication network is in an Idle mode or an Active mode; if the UE is in the Idle mode: transmitting a page message to the UE; determining whether a response to the page message is received; if the response is received, determining whether UL resources sufficient for UL load generation according to a set of parameters are available; if sufficient UL resources are available, setting up a radio access bearer to the UE for uplink load generation; and generating an UL load on the radio access bearer according to the set of parameters. The method also includes, if the UE is in the Active mode: determining whether UL resources sufficient for UL load generation according to the set of parameters are available; if sufficient UL resources are available, adding a radio access bearer to the UE dedicated to uplink load generation; and generating an UL load on the radio access bearer added according to the set of parameters.

Also in accordance with aspects of some embodiments of this invention, there is provided a system for generating an uplink (UL) load in a communication network. The system includes a mobility management entity (MME), an evolved NodeB (eNB), and a user equipment (UE). The MME is configured to determine whether the UE is in an Idle mode or an Active mode; if the UE is in the Idle mode, to cause a page message to be transmitted to the UE, to determine whether a response to the page message is received, and if the response is received, to send a setup request message to the eNB to set up a radio access bearer to the UE for UL load generation; and if the UE is in the Active mode, to send a modify request message to the eNB to add a radio access bearer to the UE dedicated to UL load generation. The eNB is configured to determine whether UL resources sufficient for UL load generation according to a set of parameters are available; if sufficient UL resources are available, to respond to the setup request message by setting up the radio access bearer to the UE for uplink load generation and configuring the UE to generate an UL load on the radio access bearer according to the set of parameters, and to respond to the modify request message by adding the radio access bearer to the UE and configuring the UE to generate an UL load on the radio access bearer added according to the set of parameter.

Also in accordance with aspects of some embodiments of this invention, there is provided a computer-readable medium have non-transient stored instructions that, when executed by a computer in a wireless communication network, cause the computer to carry out a method of generating an uplink (UL) load in the communication network. The method includes determining whether a user equipment (UE) in the communication network is in an Idle mode or an Active mode; if the UE is in the Idle mode: transmitting a page message to the UE; determining whether a response to the page message is received; if the response is received, determining whether UL resources sufficient for UL load generation according to a set of parameters are available; if sufficient UL resources are available, setting up a radio access bearer to the UE for uplink load generation; and generating an UL load on the radio access bearer according to the set of parameters. The method also includes, if the UE is in the Active mode: determining whether UL resources sufficient for UL load generation according to the set of parameters are available; if sufficient UL resources are available, adding a radio access bearer to the UE dedicated to uplink load generation; and generating an UL load on the radio access bearer added according to the set of parameters.

BRIEF DESCRIPTION OF THE DRAWINGS

The various features, objects, and advantages of this invention will be understood by reading this description in conjunction with the drawings, in which.

DETAILED DESCRIPTION

The inventor has recognized that UEs can be used for uplink load generation and control, simplifying network testing and other tasks. For example, a network operator can decide to test the network by imposing one or more test loads in one or more selected uplinks. The operator can choose a UE, e.g., by choosing the corresponding International Mobile Subscriber Identity (IMSI), that will impose the test load, and can suitably configure an appropriate Mobility Management Entity (MME) with this information using the network Operations and Maintenance (O & M) Support System (OSS). In due course, the MME informs the UE: if the selected UE is in Idle mode, the network sends the UE a page message; if the selected UE is in Active mode, with an ongoing communication session, the UE either adds a link for load generation or sends a page message after the session ends; and if the selected UE is detached from the network, the UE is informed during the initial network attach procedure. Thus, uplink load generation is controllable by the network operator, with the load information available to the MME/eNB and UE, enabling the operator to adjust an existing network and perform realistic simulations on a "green field" network, i.e., a network before launch.

Figure 1:
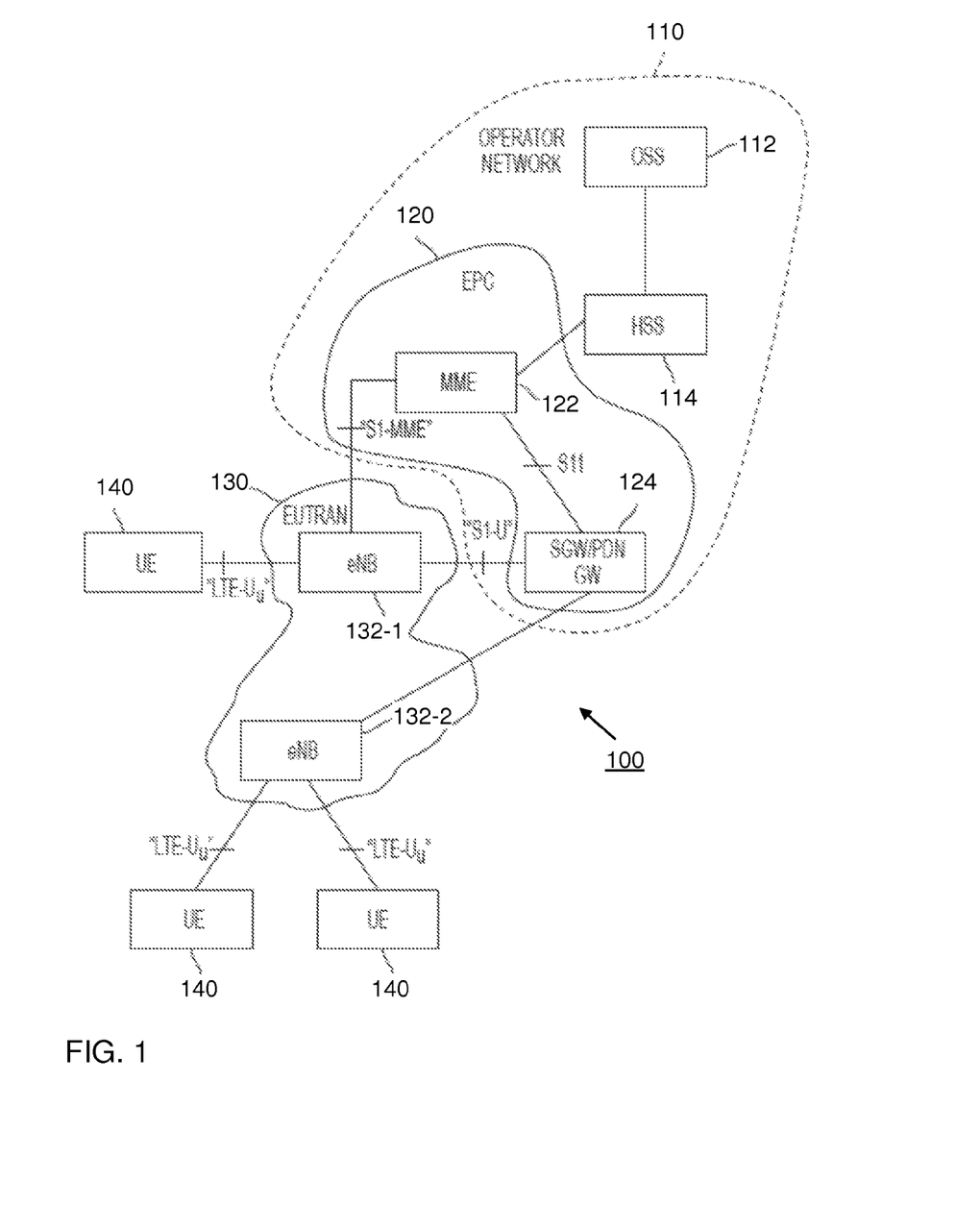
FIG. 1 illustrates an example of a communication system.

FIG. 1 illustrates a simple example of control nodes and functions in an LTE cellular communication network 100. The network 100 includes an Operator Network 110, an evolved universal terrestrial radio access network (EU-TRAN) 130, and a number of UEs 140. Other nodes can be provided in the system 100, and other configurations with more, fewer, or a different arrangement of nodes can be implemented. Moreover, one or more nodes in FIG. 1 can perform one or more of the tasks described as being performed by one or more other nodes in FIG. 1. For example, parts of the functionality of the eNBs can be divided among one or more base stations and one or more radio network controllers, and other functionalities can be moved to other nodes in the network. Features of an LTE communication network are specified in 3GPP Technical Specification (TS) 36.401 V8.7.0, Architecture Description (Release 8) (September 2009), among other specifications.

The Operator Network 110 includes an OSS 112 and a Home Subscriber Server (HSS) 114. The OSS 112 generally enables the network operator to control the network 100 and perform functions, such as configuration of network nodes and other operations/maintenance support functions. The HSS 114 is generally a database of subscriber information that supports authentication and authorization tasks in connection with UEs 140 and other nodes.

As depicted in FIG. 1, the Operator Network 110 also includes an Evolved Packet Core (EPC) 120 that includes an MME 122 that can perform (and/or support) various functions of the EUTRAN, such as bearer management functions, authentication, gateway (GW) selection, and the initial network attach procedure and paging for UEs. The EPC 120 also includes a Serving GW (SGW)/Packet Data Network GW (PDN GW) node 124. As a SGW, the node 124 performs a variety of tasks, such as packet routing and forwarding, mobility anchoring for inter-3GPP mobility (i.e., mobility between different cellular networks using 3GPP technology), and terminating an S1-U interface toward the EUTRAN 130. As a PDN GW (PGW), the node 124 also performs a variety of tasks, such as allocating Internet Protocol (IP) addresses to nodes, linking to other networks (e.g., the Internet), and acting as an anchor point for mobility between 3GPP networks and non-3GPP networks. Although depicted as a single entity, the SGW/PDN GW node 124 can be implemented as separate entities in the EPC 120, and more than one node 124 and more than one MME 122 can be provided. The HSS 114 also can, depending on the EPC definition, be considered a part of the EPC 120.

The EUTRAN 130 includes a number of eNodeBs (eNBs) 132-1, 132-2, . . . that communicate with the EPC 120 over versions of an S1 interface, e.g., S1-MME toward the MME(s) 122 and S1-U toward the SGW(s) 124. In particular, the eNBs 132 and MMEs 122 can exchange messages according to an S1 application protocol (S1AP) messages over the S1-MME interface. The S1AP protocol and messages are specified in 3GPP TS 36.413 V8.8.0, S1 Application Protocol (S1AP) (Release 8) (December 2009), among other specifications. The eNBs also communicate wirelessly with UEs 140 over an LTE-Uu interface, which generally provides control-plane signaling between a UE and the RAN according to 3GPP TS 36.331. The connection between the eNB 132-2 and MME 122 is omitted to simplify the figure, as have other connections (e.g., the OSS 112 can be connected to all nodes in the network). It will also be appreciated by those skilled in the art that an eNB 132 can be connected to a plurality of MMEs, and that the eNBs can be considered to be part of the Operator Network 110.

Each eNodeB 132-1, 132-2, . . . serves a respective geographical area that is divided into one or more cells. An eNB can use one or more antennas at one or more sites to transmit information into its cell(s), and different antennas can transmit respective, different pilot and other signals. Neighboring eNBs can be coupled to each other by an X2-protocol interface that supports active-mode mobility of the UEs. An eNB controls various radio network functions, including for example single-cell radio resource management (RRM), such as radio access bearer setup, handover, UE UL/DL scheduling, etc. Multi-cell RRM functions can also use the X2-protocol interfaces. Each eNodeB also carries out the Layer-1 functions of coding, decoding, modulating, demodulating, interleaving, de-interleaving, etc.; and the Layer-2 retransmission mechanisms, such as hybrid automatic repeat request (HARQ), and functions of radio link control (RLC) and radio resource control (RRC).

UEs 140 are generally wireless communication devices, such as cellular radiotelephones, personal digital assistants (PDAs), Personal Communications System (PCS) terminals, laptop computers, palmtop computers, or any other type of device or appliance that includes a communication transceiver that permits the device to communicate with other devices via a wireless link. A PCS terminal can combine a cellular radiotelephone with data processing, and facsimile and data communication capabilities. A PDA can include a radiotelephone, a pager, an Internet/intranet access device, a web browser, an organizer, calendars, and/or a global positioning system (GPS) receiver. One or more of UEs 140 can be referred to as a "pervasive computing" device. In some implementations, the UEs 140 can include wireline telephones (e.g., Plain Old Telephone system (POTs) telephones) that are connected to a Public Switched Telephone Network (PSTN). In any event, the UEs 140 carry out the appropriate functions of Layers 1-3 etc. in cooperation with the eNBs 132. UE operation is specified in 3GPP TS 36.304 V8.8.0, User Equipment (UE) Procedures in Idle Mode (Release 8) (December 2009), and other specifications.

LTE communication channels are described in 3GPP TS 36.211 V9.1.0, Physical Channels and Modulation (Release 9) (December 2009) and other specifications. For example, control information exchanged by eNodeBs and UEs is conveyed by physical uplink control channels (PUCCHs) and by physical downlink control channel (PDCCHs).

The network 100 can exchange information with one or more other networks of any type, including a local area network (LAN); a wide area network (WAN); a metropolitan area network; a telephone network, such as a public switched terminal network or a public land mobile network; a satellite network; an intranet; the Internet; or a combination of networks. It will be appreciated that the number of nodes illustrated in FIG. 1 is purely for example. Other configurations with more, fewer, or a different arrangement of nodes can be implemented. Moreover, one or more nodes in FIG. 1 can perform one or more of the tasks described as being performed by one or more other nodes in FIG. 1. For example, parts of the functionality of the eNodeBs can be divided among one or more base stations and one or more radio network controllers, and other functionalities can be moved to other nodes in the network.

Figure 2:
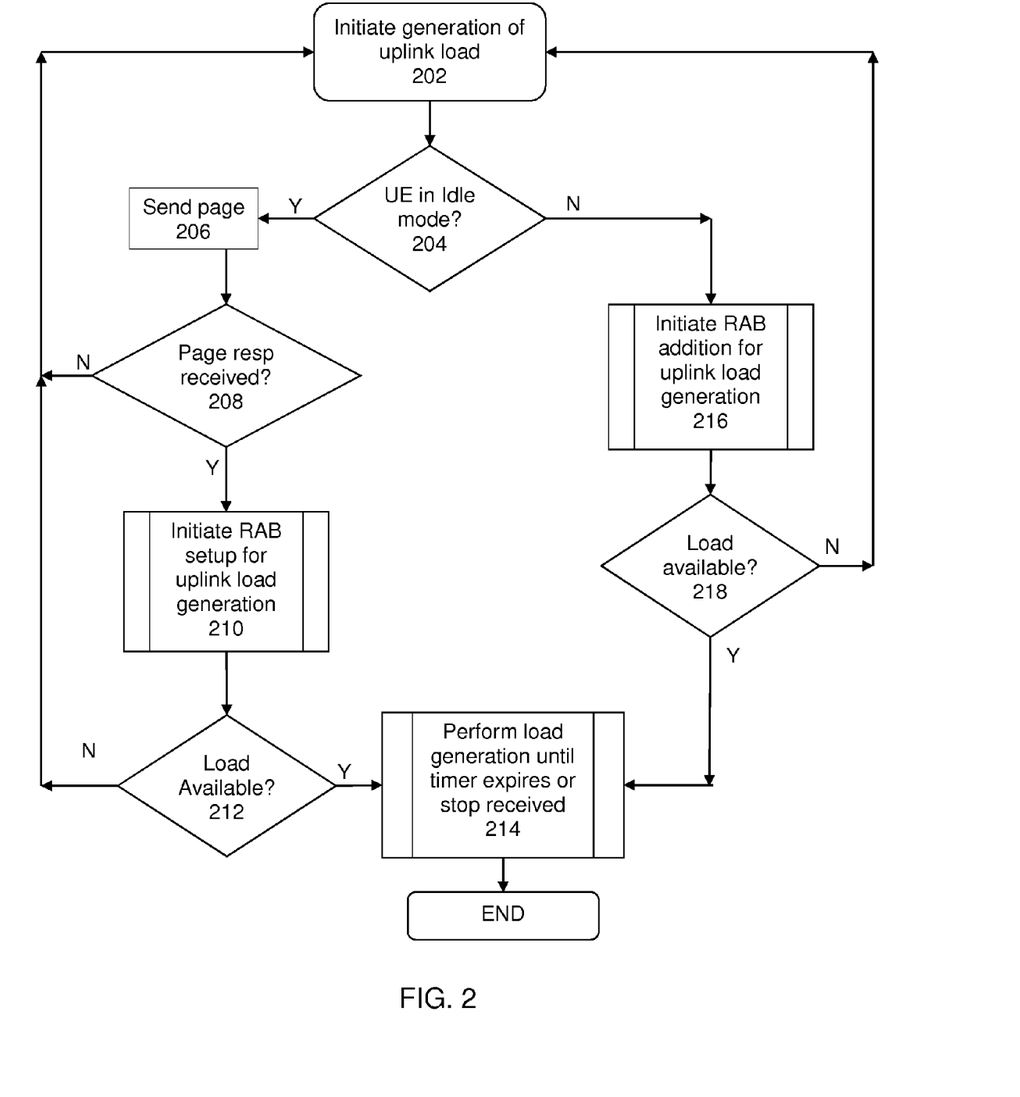
FIG. 2 is a flow chart that depicts a method of uplink load generation in a communication system.

FIG. 2 is a flow chart of a method 200 of generating an uplink load in a communication network in an embodiment of this invention. In step 202, uplink load generation is initiated for one or more UEs 140 based on parameters that include the identities, such as IMSIs, of the UEs, either a duration of the load generation or an indication that load generation is to be stopped in response to an input command, and a test load size, e.g., a value between 0% and 50%. The parameters can be chosen by the operator of the network 100 and provided to the OSS 112, which packages the parameters in one or more suitable request messages and sends the request message(s) to the MME(s) 122. In response to a received load generation request, the MME 122 determines (step 204) whether a corresponding UE is in Idle mode or in an active session, which is to say, in Active mode.

If the UE is in Idle mode (Yes in step 204), the MME 122 arranges for transmission (step 206) of a page message to the UE by an appropriate eNB 132, and determines (step 208) if it has received a response to the page message. Clause 7 of 3GPP TS 36.304, for example, specifies paging procedures of the UE in Idle mode. If no page response is received (No in step 208), the MME sends an error message or other suitable indication back to the OSS 112, and so program flow returns to step 202. If a page response is received (Yes in step 208), the MME initiates a new session (step 210) for uplink load generation, for example according to the E-UTRAN Radio Access Bearer (E-RAB) Setup procedure specified in subclause 8.2.1 of 3GPP TS 36.413 cited above.

In accordance with the E-RAB Setup procedure, the MME 122 initiates the procedure by sending an E-RAB Setup Request message to the eNB 132 that contains information required by the eNB to build the E-RAB configuration according to an "E-RAB to be Setup List" information element (IE) in the Request. Upon reception of the E-RAB Setup Request message, and if resources are available for the requested configuration, the eNB executes the requested E-RAB configuration, establishing for each E-RAB an appropriate Data Radio Bearer and allocating required resources on the Uu and S1 interfaces.

Upon receiving an E-RAB Setup Request from the MME 122, the eNB 132 determines (step 212) the number of PRBs in the uplink from the UE that are or were available during a given time period, e.g., one second, and compares that number to a threshold value or equivalently determines the percentage of UL resources available. In this way, the eNB determines whether sufficient resources are available for the requested configuration in accordance with the E-RAB Setup procedure. If on average the required resources, or load (i.e., number of uplink PRBs per unit time period) is not available (No in step 212), the MME's setup request is rejected and the eNB sends an error message or other suitable indication back to the OSS 112, and so program flow returns to step 202. If the eNB 132 determines that the uplink load is available (Yes in step 212), the MME's setup request is accepted, and uplink load generation is performed (step 214) according to the parameters, e.g., until a timer indicates that the requested duration has elapsed or until a stop command is received. In performing load generation (step 214), the eNB schedules the UE for the UL PRBs needed to ensure that a moving average of UL PRBs used for uplink load generation matches the uplink load value in the request parameters. It will be understood that such scheduling should be done with care because as the UE fills the UL load generation PRBs with "dummy" data and transmits those PRBs to the eNB, network capacity is temporarily decreased.

If the UE is already in an active session (No in step 204) with an eNB 132, the MME 122 initiates (step 216) an addition to the existing session for uplink load generation, for example according to the E-RAB Modify procedure specified in subclause 8.2.2 of 3GPP TS 36.413. The uplink load generation will then be performed as a dedicated bearer. It will be appreciated that using the E-RAB Modify procedure enables a network operator to have an uplink test load generated more or less immediately by a UE in Active mode. An alternative to using the E-RAB Modify procedure is to wait for the UE to enter Idle mode, and follow the method from Yes in step 204.

In accordance with the E-RAB Modify procedure, the MME 122 sends an E-RAB Modify Request message to the eNB 132 that contains information required by the eNB to modify one or several E-RABs of the existing E-RAB configuration. Upon reception of an E-RAB Modify Request message, and if resources are available for the requested configuration, the eNB executes the modification of the requested E-RAB configuration, modifying for each identified E-RAB the Data Radio Bearer configuration and changing the allocation of resources on the Uu and S1 interfaces.

Upon receiving an E-RAB Modify Request from the MME 122, the eNB 132 determines (step 218) the number of PRBs in the uplink from the UE that are or were available during a given time period, e.g., one second. If on average the required load (i.e., number of uplink PRBs per unit time period) is not available (No in step 218), the MME's modify request is rejected and the eNB sends an error message or other suitable indication back to the OSS 112, and so program flow returns to step 202. If the eNB 132 determines that the uplink load is available (Yes in step 218), the MME's modify request is accepted, and uplink load generation is performed (step 214), with the eNB scheduling the UE for the UL PRBs needed to ensure that a moving average of UL PRBs used for uplink load generation matches the uplink load value in the request parameters.

Uplink load generation, such as the method depicted in FIG. 2, can be triggered by a network operator command through the OSS 112 or by expiration of a suitable timer, which can be located in the OSS 112 or another network node. If triggered by the operator, the OSS advantageously informs the MME to stop the ongoing load generation session. If triggered by a timer, the MME itself initiates stopping the load generation session at timer expiry.

As depicted in FIG. 2, the MME 122 advantageously does not send any setup messages to the SGW/PDN GW 124, and user-plane network resources are not used. The eNB 132 receiving the generated uplink load simply discards all user-plane data for the uplink load E-RAB. Any error detected by a node is advantageously escalated to its higher node, and a suitable node hierarchy is, in descending order: OSS, MME, eNB, UE.

In order for uplink load generation as described above to be carried out, the E-RAB Setup Request and E-RAB Modify Request messages specified in subclauses 9.1.3.1 and 9.1.3.3, respectively, of 3GPP TS 36.413 are modified to include one or more IEs that contain the chosen parameters, i.e., the identities of the UEs (IMSI and corresponding UE-ID used by an eNB), either a duration of the load generation or an indication that load generation is to be stopped in response to an input command, and a load amount.

The following Table 1 illustrates a suitable IE, which can be called "Uplink Load" or another suitable name. In Table 1, the left-most column ("IE/Group name") lists four parameters by IE/Group name, the left-middle column ("Need") lists whether those parameters are mandatory or optional for this IE, the right-middle column ("Multi") indicates a numeric range for a parameter, and the right-most column ("Comment") includes explanatory comments. For example, Table 1 indicates that a network operator can use the Uplink Load IE for testing 1 to 100 UEs at loads from 0% to 50%. It will be understood that other arrangements of Table 1 and its information can be used.

TABLE 1

| IE/Group name | Need | Multi | Comment |
|---|---|---|---|
| Uplink Load | | 1 to 100 | |
| >IMSI | Mandatory | | |
| >Duration | Mandatory | | 0 means indefinitely till stopped by command |
| >Load (%) | Mandatory | 0-50 | |
| >UE-ID | Mandatory | | IMSI translated to eNB UE-ID |

Figure 3:
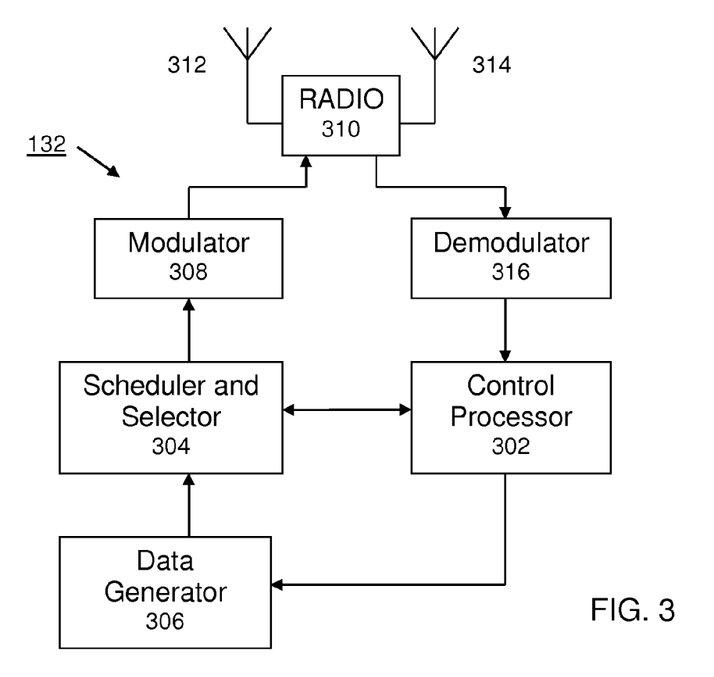
FIG. 3 is a block diagram of a portion of a transmitting node in a communication system.

FIG. 3 is a block diagram of a portion of an eNB 132, which is typical of base stations and other such transmitting nodes in a network that can communicate with UEs and implement the methods described above. It will be appreciated that the functional blocks depicted in FIG. 3 can be combined and re-arranged in a variety of equivalent ways, and that many of the functions can be performed by one or more suitably programmed digital signal processors and other known electronic circuits.

The eNB 132 is operated by a control processor 302, which typically and advantageously is a suitably programmed digital signal processor circuit. The control processor 302 typically provides and receives control and other signals from various devices in the eNB 132. For simplicity in FIG. 3, the control processor 302 is shown exchanging information with a scheduler and selector 304, which receives digital words to be transmitted to respective UEs or to be broadcast from a suitable data generator 306. The scheduler and selector 304 implements resource block and resource element scheduling and selection in an LTE system, for example, and implements code allocation in a Wideband Code Division Multiple Access (WCDMA) system, for example.

Information from the scheduler and selector 304 is provided to a modulator 308 that uses the information to generate a modulation signal suitable for the particular communication system. For example, the modulator 308 in an LTE system is an OFDM modulator. The modulation signal generated by the modulator 308 is provided to a suitable radio circuit 310 that generates a wireless signal that is transmitted through at least one transmit antenna 312. Wireless signals transmitted by UEs are captured by at least one receive antenna 314 that provides those signals to the radio 310 and a demodulator 316. The artisan will understand that the same antenna can be used for transmission and reception, as is often done in a UE.

It will be understood that the control processor 302 can be configured such that it includes one or more other devices depicted in FIG. 3, which can be implemented by dedicated programmed processors or other suitable logic configured to perform their functions. The combination of the data generator 306, scheduler and selector 304, and modulator 308 produces DL frames or sub-frames to be transmitted. The modulator 308 converts the information into modulation symbols that are provided to the radio 310, which impresses the modulation symbols on one or more suitable carrier signals. In an LTE system for example, the radio 310 impresses the modulation symbols on a number of OFDM subcarriers. The modulated subcarrier signals are transmitted through the antenna 312.

Figure 4:
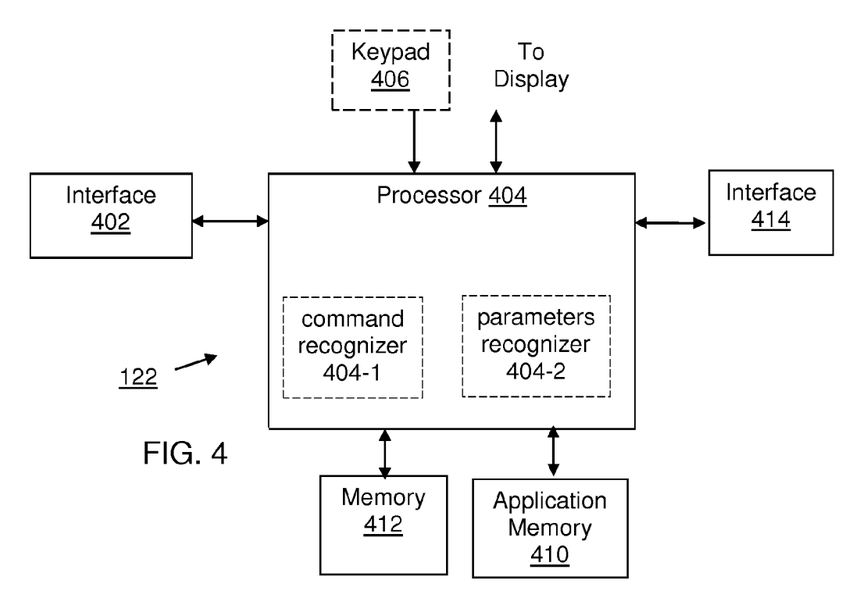
FIG. 4 is a block diagram of a portion of a mobility management entity in a communication system.

FIG. 4 is a block diagram of a portion of an MME 122 for uplink load generation as described in this application. The MME 122 includes an interface 402 that is suitable for exchanging electronic signals with the HSS 114 and OSS 112 depicted in FIG. 1. Information carried by those signals, such as an operator command to start or stop uplink load generation and associated parameters, is handled by a programmable electronic processor circuit 404, which can include one or more sub-processor circuits, and which executes one or more software modules and applications, including for example a command recognizer 404-1 and a parameter recognizer 404-2, to carry out the operations of the MME 122 described in this application. Input to the MME 122 can optionally be provided through a keypad, remote control, or other device 406, although it should be understood that operator input and a device 406 are not always necessary. Software applications can be stored in a suitable application memory 410, and the MME 122 can also download and/or cache desired information in a suitable memory 412. The MME 122 also includes an interface 414 that is suitable for exchanging electronic signals with at least the eNBs 132 depicted in FIG. 1. As described above, such signals include E-RAB Setup and Modify Requests with the IE depicted in Table 1 generated by the processor 404 and related messages.

Figure 5:
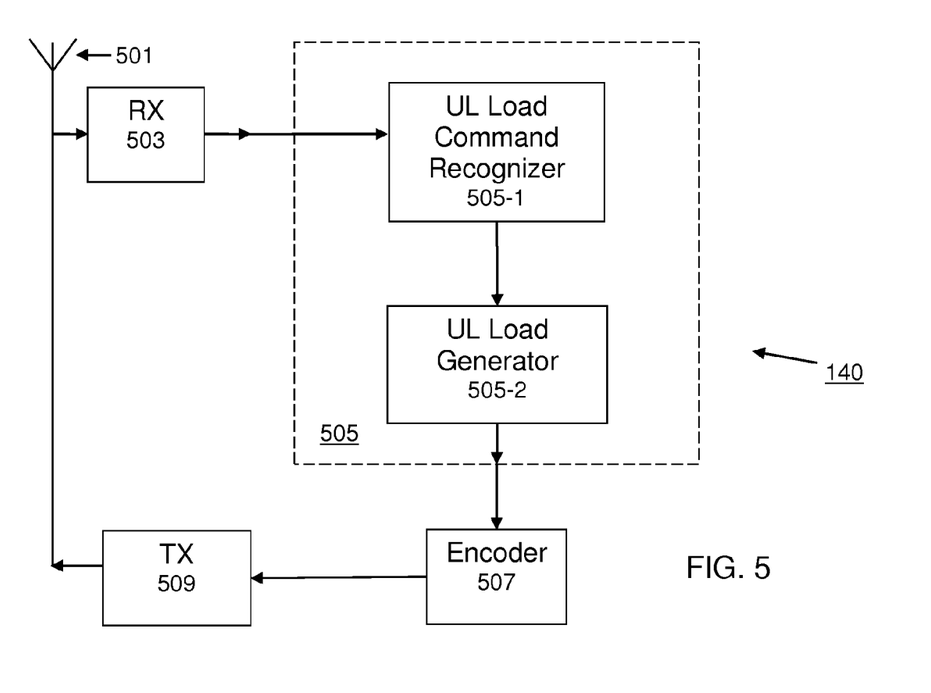
FIG. 5 is a block diagram of a system in a user equipment.

FIG. 5 is a block diagram of a system in a UE that can implement the methods described above. It will be appreciated that the functional blocks depicted in FIG. 5 can be combined and re-arranged in a variety of equivalent ways, and that many of the functions can be performed by one or more suitably programmed digital signal processor circuits, general-purpose processors, or other electronic circuitry. Moreover, connections among and information provided or exchanged by the functional blocks depicted in FIG. 5 can be altered in various ways to enable a UE to implement other methods involved in the operation of the UE.

In the system depicted in FIG. 5, a UE 140 receives a DL radio signal through an antenna 501 and extracts information from the received radio signal with a suitable receiver (RX) 503. Such information can include a page message and information suitable for a controller 505 to recognize that the UE should transmit UL data in connection with uplink load generation as described above. In that respect, the controller 505 is configured to implement an uplink load command recognizer 505-1. The controller 505 is further configured to implement a dummy load generator 505-2 that produces information suitable for UL load generation and provides that information to an encoder 507. The encoder 507 packages the information is a form suitable for UL transmission and provides the packages information to a transmitter (TX) 509 that transmits the UL load information via the antenna 501.

In the system depicted in FIG. 5, the control unit 505 keeps track of substantially everything needed to configure the UE 140, in particular everything needed for the UE's roles in the E-RAB Setup and Modify procedures. The control unit 505 provides appropriate information to the encoder 507, which generates modulation symbols or similar information that is provided to the transmitter 509, which generates a transmission signal appropriate to the communication system. The control unit 505 with the encoder 507 is suitably configured to receive and generate RRC messages and other messages exchanged by the UE 140 and eNB 132 as described above.

The control unit 505 and other blocks of the UE can be implemented by one or more suitably programmed electronic processors, collections of logic gates, etc. that processes information stored in one or more memories. Accordingly, the UE 140 includes memory or other information storage functionality suitable for carrying out the methods and receiving and generating the signals described above in cooperation with the control unit and software executed by the control unit. The stored information can include program instructions and data that enable the control unit to implement the methods described above. It will be appreciated that the control unit typically includes timers, etc. that facilitate its operations.

It will be appreciated that procedures described above are carried out repetitively as necessary, for example, to respond to the time-varying nature of communication channels between transmitters and receivers. It will also be appreciated that the methods and devices described above can be combined and re-arranged in a variety of equivalent ways, and that the methods can be performed by one or more suitably programmed or configured digital signal processors, general-purpose processors, and/or other known electronic circuits (e.g., discrete logic gates interconnected to perform a specialized function, or application-specific integrated circuits). Many aspects of some embodiments of this invention are described in terms of sequences of actions that can be performed by, for example, elements of a programmable computer system. UEs embodying this invention include, for example, mobile telephones, pagers, headsets, laptop computers and other mobile terminals, and the like. Moreover, some embodiments of this invention can additionally be considered to be implemented using any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions.

As used here, a "computer-readable medium" can be any means that can contain or store the program for use by or in connection with the instruction-execution system, apparatus, or device. The computer-readable medium can be, for example but not limited to, an electronic, magnetic, optical, electromagnetic, infrared, or semiconductor system, apparatus, or device. More specific examples (a non-exhaustive list) of the computer-readable medium include a portable computer disk, a random-access memory (RAM), a read-only memory (ROM), and an erasable programmable read-only memory (EPROM or Flash memory).

Thus, the invention may be embodied in many different forms, not all of which are described above, and all such forms are contemplated to be within the scope of the invention. For each of the various aspects of the invention, any such form may be referred to as "logic configured to" perform a described action, or alternatively as "logic that" performs a described action.

What is claimed is:

1. A method of generating an uplink (UL) load in a communication network, comprising:
determining whether a user equipment (UE) in the communication network is in an Idle mode or an Active mode;
if the UE is in the Idle mode:
transmitting a page message to the UE;
determining whether a response to the page message is received;
if the response is received, determining whether UL resources sufficient for UL load generation according to a set of parameters are available;
if sufficient UL resources are available, setting up a radio access bearer to the UE for uplink load generation; and
generating an UL load on the radio access bearer according to the set of parameters; and
if the UE is in the Active mode:
determining whether UL resources sufficient for UL load generation according to the set of parameters are available;
if sufficient UL resources are available, adding a radio access bearer to the UE dedicated to uplink load generation; and
generating an UL load on the radio access bearer added according to the set of parameters.

2. The method of claim 1, wherein the set of parameters includes an identifier of the UE, either a duration of load generation or an indication that load generation is to be stopped in response to an input command, and a test load size.

3. The method of claim 1, wherein setting up the radio access bearer includes sending a Setup Request message to an evolved NodeB in the communication network.

4. The method of claim 1, wherein adding the radio access bearer includes sending a Setup Modify message to an evolved NodeB in the communication network.

5. The method of claim 1, wherein determining whether UL resources sufficient for UL load generation are available includes determining a number of physical resource blocks in an UL from the UE available during a set time period, and comparing the number to a threshold value.

6. The method of claim 1, wherein generating an UL load on the radio access bearer includes scheduling the UE for UL physical resource blocks (PRBs) needed to ensure that a moving average of UL PRBs used for uplink load generation corresponds to the set of parameters.

7. A system for generating an uplink (UL) load in a communication network, comprising:
a mobility management entity (MME), an evolved NodeB (eNB), and a user equipment (UE);
wherein the MME is configured to determine whether the UE is in an Idle mode or an Active mode; if the UE is in the Idle mode, to cause a page message to be transmitted to the UE, to determine whether a response to the page message is received, and if the response is received, to send a setup request message to the eNB to set up a radio access bearer to the UE for UL load generation; and if the UE is in the Active mode, to send a modify request message to the eNB to add a radio access bearer to the UE dedicated to UL load generation; and
wherein the eNB is configured to determine whether UL resources sufficient for UL load generation according to a set of parameters are available; if sufficient UL resources are available, to respond to the setup request message by setting up the radio access bearer to the UE for uplink load generation and configuring the UE to generate an UL load on the radio access bearer according to the set of parameters, and to respond to the modify request message by adding the radio access bearer to the UE and configuring the UE to generate an UL load on the radio access bearer added according to the set of parameter.

8. The system of claim 7, wherein the set of parameters includes an identifier of the UE, either a duration of load generation or an indication that load generation is to be stopped in response to an input command, and a test load size.

9. The system of claim 7, wherein the eNB is configured to determine whether UL resources sufficient for UL load generation are available by at least determining a number of physical resource blocks in an UL from the UE available during a set time period, and comparing the number to a threshold value.

10. The system of claim 7, wherein the eNB configures the UE to generate the UL load on the radio access bearer by at least scheduling the UE for UL physical resource blocks (PRBs) needed to ensure that a moving average of UL PRBs used for uplink load generation corresponds to the set of parameters.

11. A non-transitory computer-readable medium have non-transient stored instructions that, when executed by a computer in a wireless communication network, cause the computer to carry out a method of generating an uplink (UL) load in the communication network, wherein the method comprises:

determining whether a user equipment (UE) in the communication network is in an Idle mode or an Active mode;

if the UE is in the Idle mode:
    transmitting a page message to the UE;
    determining whether a response to the page message is received;
    if the response is received, determining whether UL resources sufficient for UL load generation according to a set of parameters are available;
    if sufficient UL resources are available, setting up a radio access bearer to the UE for uplink load generation; and
    generating an UL load on the radio access bearer according to the set of parameters; and if the UE is in the Active mode:
    determining whether UL resources sufficient for UL load generation according to the set of parameters are available;
    if sufficient UL resources are available, adding a radio access bearer to the UE dedicated to uplink load generation; and
    generating an UL load on the radio access bearer added according to the set of parameters.

12. The non-transitory computer-readable medium of claim 11, wherein the set of parameters includes an identifier of the UE, either a duration of load generation or an indication that load generation is to be stopped in response to an input command, and a test load size.

13. The non-transitory computer-readable medium of claim 11, wherein setting up the radio access bearer includes sending a Setup Request message to an evolved NodeB in the communication network.

14. The non-transitory computer-readable medium of claim 11, wherein adding the radio access bearer includes sending a Setup Modify message to an evolved NodeB in the communication network.

15. The non-transitory computer-readable medium of claim 11, wherein determining whether UL resources sufficient for UL load generation are available includes determining a number of physical resource blocks in an UL from the UE available during a set time period, and comparing the number to a threshold value.

16. The non-transitory computer-readable medium of claim 11, wherein generating an UL load on the radio access bearer includes scheduling the UE for UL physical resource blocks (PRBs) needed to ensure that a moving average of UL PRBs used for uplink load generation corresponds to the set of parameters.

* * * * *